Oct. 22, 1968      R. N. HANCOX      3,406,850

HYDRAULIC SYSTEM FOR EXCAVATOR

Filed Sept. 20, 1965      5 Sheets-Sheet 1

INVENTOR
RONALD NORMAN HANCOX
BY
ATTORNEYS

Fig. 2.

INVENTOR
RONALD NORMAN HANCOX
ATTORNEYS

Oct. 22, 1968   R. N. HANCOX   3,406,850
HYDRAULIC SYSTEM FOR EXCAVATOR
Filed Sept. 20, 1965   5 Sheets-Sheet 3

INVENTOR
RONALD NORMAN HANCOX
BY
Barnes, Kisselle, Raisch & Choate
ATTORNEYS

Oct. 22, 1968  R. N. HANCOX  3,406,850
HYDRAULIC SYSTEM FOR EXCAVATOR
Filed Sept. 20, 1965  5 Sheets-Sheet 4

FIG. 7

INVENTOR
RONALD NORMAN HANCOX
BY

ATTORNEYS

Oct. 22, 1968 R. N. HANCOX 3,406,850
HYDRAULIC SYSTEM FOR EXCAVATOR
Filed Sept. 20, 1965 5 Sheets-Sheet 5

FIG. 8

INVENTOR
RONALD NORMAN HANCOX
BY
ATTORNEYS

United States Patent Office 3,406,850
Patented Oct. 22, 1968

3,406,850
HYDRAULIC SYSTEM FOR EXCAVATOR
Ronald Norman Hancox, Havant, England, assignor to Sperry Rand Coporation, Troy, Mich., a corporation of Delaware
Filed Sept. 20, 1965, Ser. No. 488,344
Claims priority, application Great Britain, Sept. 22, 1964, 38,618/64
11 Claims. (Cl. 214—138)

The present invention relates to a hydraulic supply and control system for operating hydraulic equipment which requires a varying operating pressure and has a varying volumetric consumption of hydraulic fluid.

Many types of hydraulic equipment, and in particular agricultural and earth moving equipment, consume a varying quantity, or volume of hydraulic fluid during operation and require varying operating pressures. If a hydraulic pump having a constant rate of delivery is used, the full flow of the pump is raised to the service pressure requirement. If the flow requirement of the service is low, then the excess fluid is returned to the reservoir, i.e. the power consumed by the pump far exceeds the service requirement.

An alternative system employs a variable volume pump, such as a swashplate pump, so as to reduce the power loss for a low flow requirement by producing the exact flow, at a compensated maximum pressure. However, this maximum pressure may be far in excess of the service working pressure and therefore power losses are still existent.

Power losses in the system result in considerable heat input to the hydraulic fluid, which lowers the viscosity of the fluid, giving rise to excessive leakage and lower volumetric efficiencies. Extreme temperatures result in a breakdown of fluid lubrication properties and cause premature failure of hydraulic equipment.

An object of the present invention is to provide a hydraulic supply and control system in which both the delivery pressure and the delivery volume of the pump are matched more closely to the instantaneous requirements of the hydraulic equipment being operated.

According to the present invention, a hydraulic supply and control system for supplying and controlling hydraulic equipment having variable requirements as regards operating pressure and volumetric conumption of hydraulic fluid comprises a variable volume pump connected by its delivery to a supply port of at least one control valve, said control valve having at least one service port for connection to the hydraulic equipment, and a control device for adjusting the pump, said control device being connected to a service pressure conduit connected so as to be subjected substantially to the instantaneous operating pressure of the hydraulic equipment when operating, whereby to adjust the delivery volume of the pump to correspond to the requirements of the equipment connected to said service port.

The invention includes a backhoe provided with an actuator for achieving a slewing motion and a hydraulic supply and control system for the actuator and connected to the actuator by two service conduits containing cam-controlled positional valves, the cams of such valves being adjustable, whereby the slewing motion in either direction may be terminated automatically at a predetermined position.

The invention is further described, by way of example, with reference to the accompanying drawings, in which.

Figure 1:
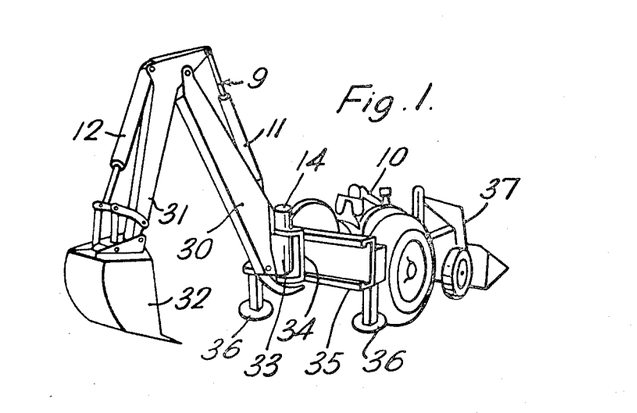
FIG. 1 is a somewhat diagrammatic perspective view of a tractor provided with a digger or backhoe operated by a hydraulic supply and control system constructed in accordance with the present invention.

FIG. 1 of the drawings shows a rear mounted digger or backhoe 9 mounted on a tractor 10. The backhoe 9 comprises a dipper 31 pivoted to a boom 30 and pivotally supporting a bucket 32. The boom 30 is itself pivoted to a support 33 which is journalled to a vertical kingpost mounted on a bracket 34. The bracket 34 is slidably attached to a transverse slide 35 mounted at the rear of the tractor 10. The tractor 10 has a pair of retractable rear stabilizers or jacks 36, which are extended to lift the rear tractor wheels from the ground during operation of the backhoe 9. The tractor 10 is also provided with a conventional front loader 37. During operation of the backhoe further stabilization may be achieved by using the front loader 37 to raise the front wheels of the tractor 10 from the ground.

Figure 2:
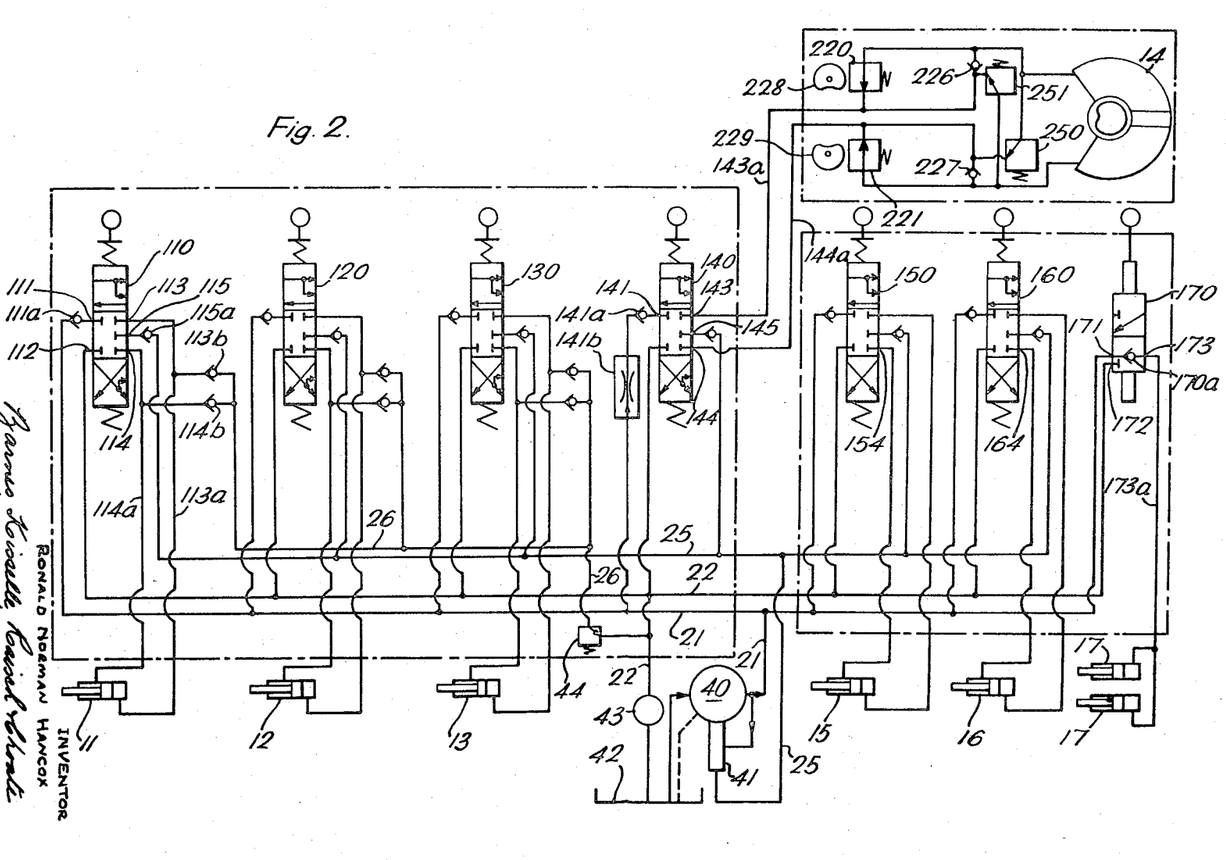
FIG. 2 is a circuit diagram of the hydraulic system.

Operation of the dipper 31 is effected by a double-acting hydraulic cylinder 11 whilst crowding of the bucket is achieved by a double-acting hydraulic cylinder 12. Slewing of the backhoe 9 about the kingpost is achieved by a double-acting rotary actuator 14. Raising and lowering of the boom 30 is achieved by a double-acting hydraulic cylinder 13 which is concealed in FIG. 1 but is indicated in FIG. 2. The stabilizers 36 are extensible and retractable by double-acting hydraulic cylinders 15 and 16, also seen only in FIG. 2. The bracket 34 may be clamped to the slide 35 in any selected position by means of a pair of single-acting hydraulic cylinders 17, again only shown in FIG. 2.

During a normal operational cycle of the backhoe 9 the loading on the cylinders 11, 12 and 13 and the actuator 14 may vary very considerably so that during some parts of the cycle a high service pressure is required and during other parts of the cycle only a low service pressure is necessary. Moreover during some parts of the cycle a large volume of hydraulic fluid is required and during other parts of the cycle, e.g., when "inching," only a small volume is required. If a pump having a constant delivery volume were used, the hydraulic system would be working very inefficiently during most parts of the cycle, i.e., during those parts in which the maximum volume is not required.

The hydraulic system shown in FIG. 2 of the drawings for operating the cylinders 11, 12, 13, 15, 16 and 17 and the actuator 14 contains a variable volume pump 40 whose capacity is adjusted by an adjusting device 41 in accordance with the highest service pressure required at any one time for the cylinders 11, 12, 13, 15 and 16 and the actuator 14.

The pump draws hydraulic fluid from a reservoir 42 and its outlet is connected to a supply conduit 21. A drain conduit 22 is connected to a filter 43 leading back to the reservoir 42. The supply conduit 21 is connected through an individual non-return valve 111a to a supply port 111 of a three-position control valve 110. The return port 112 of this valve is connected to the drain conduit 22. The valve 110 serves for controlling the double-acting cylinder 11 and for this purpose its service ports 113, 114, are connected by service conduits 113a and 114a to opposite ends of the cylinder 11. A service pressure port 115 of the valve 110 is connected through a non-return valve 115a to a service pressure conduit 25 leading to the pump adjusting device 41. The service conduits 113a and 114a are connected through non-return valves 113b and 114b to a service line relief conduit 26 leading to a service line relief valve 44 whose outlet is connected to the drain conduit 22 upstream of the filter 43.

The valves are drawn using J.I.C. symbols which are described in the "Hydraulic Handbook" published by the Trade and Technical Press. The valve 110 is represented by three squares one above the other, of which the middle square represents the connections when the valve is in its normal centre position. Thus when the valve 110 is in the centre position all of the ports 111 to 115 are closed. The upper square represents the connections achieved by operating the valve downwardly. These connections can be ascertained by imagining that the upper square is placed over the middle square. Thus when the valve is operated downwardly the supply port 111 is connected to the service port 113 and the service port 114 is connected to the return port 112. At the same time the service port 113, being the port to which the hydraulic fluid is being supplied is connected in an unrestricted manner to the service pressure port 115. Thus the pressure appearing at the port 115 is substantially equal to the service pressure in the service conduit 113a irrespective of what throttling of the hydraulic fluid takes place in the valve 110 between the supply port 111 and the service port 113. Similarly the lower square represents the connections when the valve 110 is operated upwardly. By imagining the lower square is placed on the middle square it can be seen that when the valve is moved upwardly, the supply port 111 is connected to the service port 114 and the service port 113 is connected to the return port 112. Thus the connections to the cylinder 11 are reversed. At the same time the service conduit 114a, which is now the one subjected to pressure, is connected to the service pressure port 115 in an unrestricted manner. The valve 110 is spring biased to its centre position and this is represented diagrammatically by spring shown both above and below the three squares representing the valve 110. The valve 110 is manually operated and this is represented by an operating knob drawn above the valve.

Three-position control valves 120, 130 and 140 for controlling the cylinders 12 and 13 and the rotary actuator 14 respectively and are all of similar construction to the valve 110. They will therefore not be described in detail. Valves 150 and 160 for the cylinders 15 and 16 differ in construction from the valves 110 to 140 only in that, in the "up" position of these valves (for raising the stabilizers), their service ports 154 and 164 are not connected to their service pressure ports 155 and 165 leading to the service pressure conduit 25.

The valves 120, 130, 150 and 160 are connected to the conduits 21, 22 and 25 and to their respective cylinders 12, 13, 15 and 16 in the same manner as the valve 110. Also the service conduits for the cylinders 12 and 13 are connected through non-return valves to the service line relief conduit 26 but the service conduits for the cylinders 15 and 16 are not connected to the service line relief conduit. The connections to the valve 140 for controlling the rotary actuator 14 are somewhat different from the connections to the other valves and will be described in more detail further below.

The control valve 170 is a two-position valve having a supply port 171 connected to the supply pressure conduit 21 and a return port 172 connected to the drain conduit 22. The valve 170 has only one service port 173 which is connected by a service conduit 173a to one end of each of the two single-acting cylinders 17. In the normal position of the valve 170 represented diagrammatically in the drawings the supply port 171 is connected through a non-return valve 170a to the service port 173 so that normally a clamping pressure is applied to the cylinders 17. When the valve 170 is operated downwardly the supply port 171 is closed and the service port 173 is connected directly to the return port 172 to relieve the pressure in the clamping cylinders 17. The valve 170 is manually operated and is retained in each of its two positions by detents which are represented by the rectangles shown above and below the two squares representing the valve itself.

Figure 3:
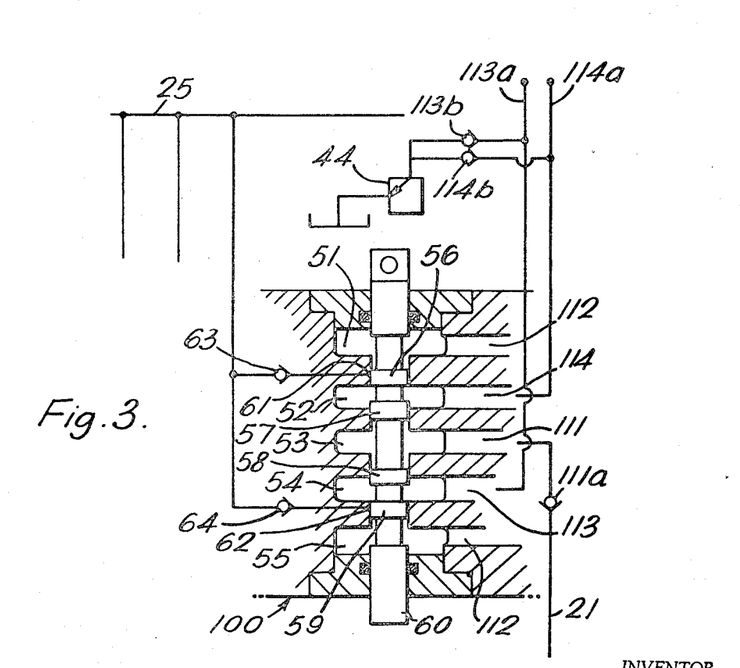
FIG. 3 is a diagrammatic sectional view of a control valve of the hydraulic system.

The actual internal construction of the valve 110 is more apparent from FIG. 3. The valve 110 has five annular chambers 51 to 55, the centre one 53 of which forms the supply port 111 connected through the non-return valve 111a to the supply conduit 21. The two outermost chambers 51 and 55 are interconnected by a passage (not shown) and together represent the return port 112. The inner chamber 54 between the centre chamber 53 and the lower chamber 55 represents the service port 113 whilst the inner chamber between the centre chamber 53 and the upper chamber 51 represents the service port 114. The chambers 51 to 55 are interconnected by parts of a longitudinal bore in which a valve spool 60 is a close sliding fit. In the neutral position of the valve illustrated, lands 56, 57, 58 and 59 isolate the chambers 51 to 55 from one another. The parts of the longitudinal bore between the chambers 51 and 52 and between the chambers 54 and 55 contain pressure sensing ports 61 and 62 respectively. In the neutral position of the valve, these ports 61 and 62 are closed by the lands 56 and 59 respectively. When the valve spool 60 is moved downwardly, the supply port 111 is connected to the service port 113 and the service port 114 is connected to the uppermost chamber 51 and thence to the return port 112. At the same time the pressure sensing port 62 is connected unrestrictedly to the service port 113. Likewise, if the valve spool 60 is moved upwardly from its neutral position, the supply port 111 is connected to the service port 114 and the service port 113 is connected to the lowermost chamber 55 leading to the return port 112. At the same time the pressure sensing port 61 is connected unrestrictedly to the service port 114. The ports 61 and 62 are connected through individual non-return valves 63 and 64 respectively to the service pressure conduit 25. Thus the service pressure port 115 of FIG. 2 represents collectively the two pressure sensing ports 61 and 62 whilst the non-return valve 115a represents collectively the non-return valves 63 and 64. When the valve spool 60 is moved downwardly, the port 61 is connected to the return conduit 22 and so the non-return valve 63 prevents the pressure sensed by the port 62 from being lost. The non-return valve 64 likewise prevents the pressure being lost when the valve spool 60 is moved upwardly.

It may happen that more than one of the valves 110, 120, 130, 140, 150, 160 is operated at any one time. In this case the pressure in the service pressure conduit 25 is the highest of the service pressures in the hydraulic cylinders being operated. The individual non-return valves 115a etc. between the service pressure ports 115 etc. of the control valves and the service pressure conduit 25 prevent fluid flow through this conduit back into an operated valve controlling a lower service pressure.

Figure 4:
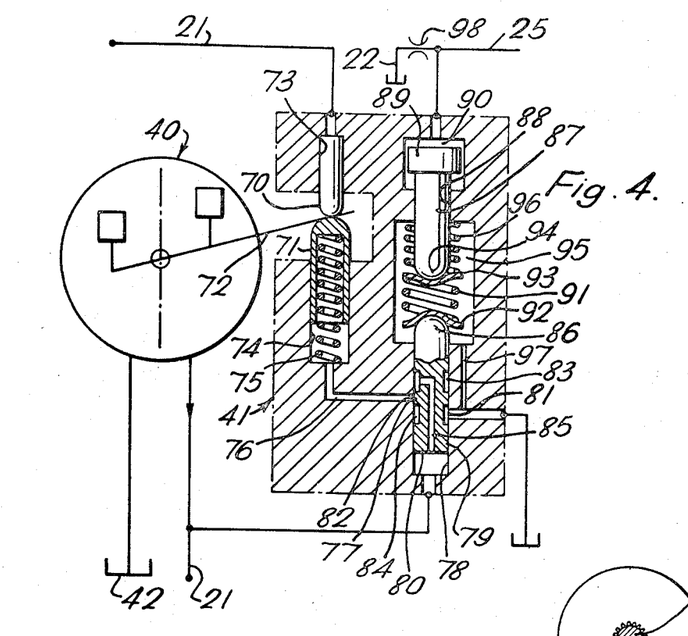
FIG. 4 is a diagrammatic sectional view of one embodiment of adjusting device for a variable volume pump of the hydraulic system.

The pump adjusting device 41 connected to the service pressure conduit 25 is shown in more detail in FIG. 4 which also shows the pump 40 diagrammatically as a swash-plate pump. The swashplate angle is adjustable between zero and maximum by two oppositely acting plungers 70 and 71, between domed ends of which a swashplate operating lever 72 is retained. The rear of the plunger 70 is subjected to the pump delivery pressure prevailing in the supply conduit 21. The plunger 71 is slidable in a cylinder 74 which is of larger diameter than the cylinder 73 in which the plunger 70 is slidable and which is connected to the conduit 21. The plunger 71 is biased by a light spring 75 to the maximum volume position of the pump 40. The cylinder 74 is connected by a duct 76 to a port 77 in a cylindrical bore 78 containing a valve slide 79. The rear end 80 of the valve slide 79 is subjected to the pump delivery pressure prevailing in the supply conduit 21. The wall of the bore 78 has another port 81 offset from the port 77 and connected to the drain conduit 22. A land 82 separates two annular peripheral grooves 83 and 84 in the valve slide 79. The forward groove 83 is connected by a passage 85 in the valve slide 79 to the rear end 80 of the valve slide and thus also to the pump delivery pressure. The forward end 86 is subjected to the force of a piston 87 slidable in a bore 88 of the same diameter as the bore 78 containing the valve slide 79. The rear end 89 of the piston 87 is received in a chamber 90 connected to the service pressure conduit 25. A stiff compression spring 91 is arranged between indented plates 92 and 93 arranged on the forward ends 86 and 94, which are domed, of the valve slide 79 and the piston 87 respectively. A weak compression spring 96 acts between the upper plate 93 and the upper end of a chamber 95 containing the springs 91 and 96. A passage 97 drains any leakage fluid from the chamber 95 to the drain conduit 22. The service pressure conduit 25 adjacent to the adjusting device 41 is connected through an orifice bleed 98 to the drain conduit 22 to relieve the fluid pressure from the conduit 25 when all the control valves are set in their normal neutral position. Thus, when all the control valves are in their neutral position, the pressure prevailing in the chamber 90 is substantially atmospheric whilst, when one or more of the control valves is operated, the pressure prevailing in the chamber 90 is the highest of the service pressures.

Before the pump 40 is started, the pressure in the chamber 90 is atmospheric and the swashplate angle is set at maximum by the spring 75. When the pump is started, the delivery pressure acts on the lower end 80 of the valve slide 79 to move the valve slide 79 upwardly so that its groove 84 interconnects the ports 77 and 81. The cylinder 74 is thereby connected to the drain conduit 22 and thence to atmospheric pressure. On the other hand the pump delivery pressure acts on the rear end of the plunger 70 to displace the swashplate operating lever 72 against the plunger 71. The swashplate angle is thereby immediately set at substantially zero so that the pump 40 does not deliver and its delivery pressure does not rise. If one of the control valves is operated, the pressure in the chamber 90 rises towards the pump delivery pressure and produces a force acting on the piston 87 which, together with the force of the spring 96, is sufficient to move the valve slide 79 downwardly until the land 82 passes the port 77 and the pump delivery pressure is applied through the passage 85, the groove 83 and the port 77 to the cylinder 74. Since the plunger 71 is larger than the plunger 70, a pressure in the cylinder 74 lower than the pump delivery pressure applied to the rear end of the plunger 70 is sufficient to displace the swashplate operating lever 72 against the plunger 70 to increase the swashplate angle so that the swashplate pump 40 is set at the required volume to deliver the required pressure. A rise in the maximum service pressure causes a rise in the pressure in the chamber 90 which displaces the valve slide 79 further downwards to increase the pressure in the cylinder 74 and so set the pump 40 to deliver a greater volume. A fall in service pressure in the conduit 25 on the other hand permits the pump delivery pressure acting on the lower end 80 of the valve slide 79 to displace the valve slide so that the groove 84 communicates with the port 77 until the pressure in the cylinder 74 is sufficiently reduced for the swashplate angle to be set at the required new value.

When the service pressure is so high that the piston 87 reaches the limit of its travel, the stiff spring 91 becomes effective to determine the maximum delivery pressure of the pump 40.

Since the device 41 adjusts the pump 40 to deliver the required volume of hydraulic fluid at the pressure required in the service conduit at the highest pressure, the pump 40 need not be provided with a relief valve for returning any fluid delivered by the pump directly back to the reservoir 42.

During operation of the backhoe, it may happen that one of the cylinders, 11, 12 and 13 is subjected to an excessively high pressure when its respective control valve 110, 120, 130 is in its closed centre position. Such excess pressure is relieved through the respective non-return valves 113b, 114b etc. to the service line relief conduit 26 and thence through the relief valve 44 to the drain conduit 22 and the reservoir 42. The non-return valves 113b, 114b etc. prevent any excess pressure prevailing in one service conduit being transmitted to another service conduit. The service conduits to the hydraulic cylinders 15, 16 and 17 are not connected to the service line relief valve 44 because these cylinders are not liable to receive excessive loads. The service line relief valve 44 is however available for relieving any hydraulic cylinder which may be subjected to overload when its respective control valve is closed.

Figure 5:
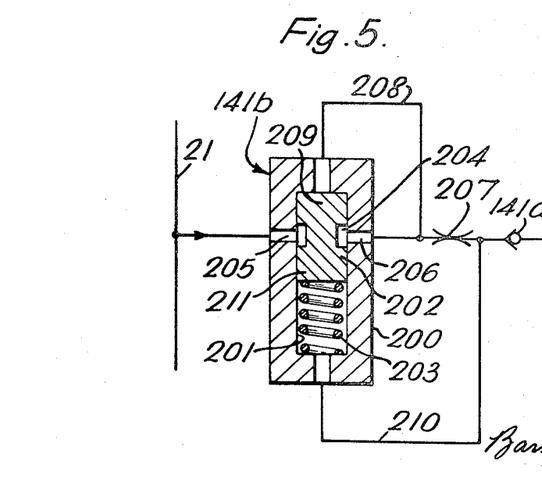
FIG. 5 is a diagrammatic section of a flow control valve of the system.

As the rotary actuator 14 must never be driven at high speed, the supply conduit 21 is connected through a flow control valve 141b to the non-return valve 141a and the supply port 141 of the control valve 140 for the rotary actuator 14. This flow control valve is shown in detail in FIG. 5 and comprises a housing 200 having a bore 201 in which a valve slide 202 is slidable. The valve slide 202 is biassed towards its forward terminal position illustrated by a compression spring 203. The valve slide 202 has an annular groove 204 which, in the illustrated terminal position of the valve slide, interconnects a port 205, connected to the supply conduit 21, and a port 206, connected through a throttle 207 to the non-return valve 141a and the control valve port 141. The pressure prevailing upstream of the throttle 207 but downstream of the port 206 is applied by a conduit 208 to the forward end 209 of the valve slide 202 whilst the pressure prevailing downstream of the throttle 207 is applied by a conduit 210 to the rear end 211 of the valve slide. Thus the pressure difference across the throttle 207 is applied to the valve slide 202 which is moved rearwardly against the force of the spring 203 whereby flow through the valve 141b is restricted to maintain a predetermined pressure drop across the throttle 207. This predetermined pressure drop corresponds to a predetermined rate of flow through the throttle 207 which is the maximum rate of flow permitted for the rotary actuator 14. Excess pressure does not build up in the supply conduit 21 because the pump adjusting device 41 adjusts the pump delivery pressure and volume to that required, the service pressure port 145 of the control valve 140 being connected through a non-return valve 145a to the service pressure conduit 25 for this purpose.

Referring again to FIG. 2 the opposite sides of the rotary actuator 14 are connected through cam-controlled positional valves 220 and 221, respectively to the service ports 143 and 144 of the control valve 140. Non-return valves 226 and 227 are connected in parallel with the valves 220 and 221 respectively so that the valves 220 and 221 only control hydraulic fluid returning from the actuator. Cams 228 and 229 for actuating the valves 220 and 221 respectively are secured to the kingpost whilst the valves 220 and 221 move with the actuator cylinder.

Figure 6:
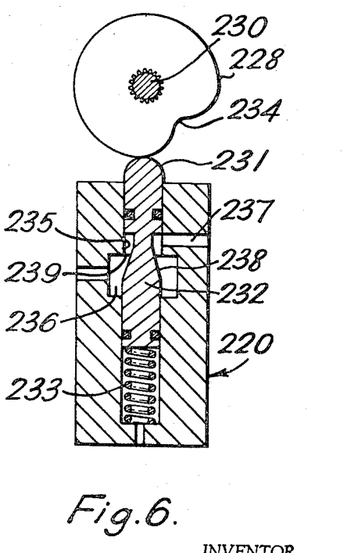
FIG. 6 is a diagrammatic section of a cam-controlled valve of the system.

FIG. 6 shows the valve 220 in detail and the valve 221 is similar. FIG. 6 shows the cam 228 attached to the kingpost indicated by the reference 230. Means (not shown) are provided for readily changing the angular position of the cam 228 relative to the kingpost. The forward domed end 231 of the valve plunger 232 is urged by a compression spring 233 against the periphery of the cam 228. This cam periphery has a single indentation 234 but is otherwise circular. The valve plunger 232 is slidable in a bore 235 extending from a valve chamber 236 connected to one side of the rotary actuator 14. An outlet 237 leading from the bore 235 is connected to the service conduit 143a. The valve plunger 232 has a tapered portion 238 which co-operates with the lip 239 of the bore 235. Thus flow fluid through the valve 220 is throttled according to the position of the valve plunger 232. Normal flow through the valve 220 is achieved when the plunger 232 is in the position illustrated in which its domed end 231 engages the circular part of the cam periphery. The cam 228 is set so that as the backhoe is slewed towards a desired terminal position the domed end 231 gradually enters the indentation 234 and the fluid flow through the valve 220 is gradually restricted to slow down the slewing motion. Finally the valve plunger 232 reaches the bottom of the indentation 234 whereupon the fluid return from the rotary actuator is substantially shut off. During operation of the positional valve 221, achieved by appropriate downward operation of the control valve 140 to operate the actuator 14 in one direction, the hydraulic fluid flows through the non-return valve 226 by-passing the positional valve 220 and enters one side of the actuator. The fluid displaced from the other side returns through the positional valve 221. Likewise, when the control valve 140 is operated upwardly to operate the actuator 14 in the other direction, the positional valve 220 and the non-return valve 227 are operative. Thus during operation of the backhoe the cams 228 and 229 can be preset to desired extreme angular positions of the backhoe. This is of particular advantage when it is always desired to return the backhoe to the same position to take a fresh cut as it saves time which would otherwise be wasted in "inching."

When the rotary actuator 14 reaches either of its terminal positions predetermined by the cams 228, 229 the fluid return from the rotary actuator is terminated. This positively arrests the slewing motion.

In order to protect the actuator from overloads, cross line relief valves 250 and 251 are connected in opposite directions in series with the non-return valves 227 and 226 respectively between the two sides of the actuator directly adjacent the actuator. This is to provide a minimum amount of pipework for the fluid being relieved to flow through so that pressure relief may be very rapid. The valves 250 and 251 also prevent an excessive building up of pressure in the service conduits 143a and 144a. If the control valve 140 is left operated after one of the valves 221 and 220 has closed upon the rotary actuator 14 reaching a terminal position, the service pressure in the respective service conduit 143a or 144a rises until the respective relief valve 250 or 251 opens. This service pressure is applied to the service pressure conduit 25 to adjust the pump 40 to deliver a greater volume when in fact no delivery is required. Thus prompt return of the valve 140 to its neutral position is required after the rotary actuator 14 has reached its terminal position if the advantages of the adjusting device 41 are to be obtained.

The service line relief valve 44 may be set for example to relieve at 3000 p.s.i. but the cross line relief valves 250 and 251 are preferably set to relieve at a lower pressure, for example 1500 p.s.i.

Although the valves 110, 120, 130, 140, 150 and 160 are all described as being of the same or similar construction they may not in fact all be of the same size. The latter three of these valves may be made much smaller than the former three as they never have to pass the maximum output of the pump 40.

As previously mentioned, the pressure is normally continuously applied to the clamping cylinders 17 to hold the bracket 34 clamped to the slide 35. For moving the backhoe 9 laterally to a new position, the valve 170 is operated to relieve the clamping pressure from the cylinders 17. The bucket 32 is lowered to the ground and embedded sufficiently therein so that, by suitable manipulation of the cylinders 11, 12 and 13 and the rotary actuator 14, the bracket is caused to slide along the slide 35 to the desired new position. The valve 170 is then returned to its normal position so that clamping pressure is re-applied to the clamping cylinders 17.

The front loader 37 may be operated from the pump 40 utilising valves similar to the valve 110 but without any connections to the service line relief valve 44 as these are not necessary.

For achieving the slewing motion the rotary actuator may be replaced by a rack and pinion driven by two oppositely directed single-acting hydraulic cylinders (or by a double-acting cylinder). As such cylinders can withstand higher pressures than a rotary actuator they can be connected to the service line relief valve and cross line relief valves are not necessary.

Figure 7:
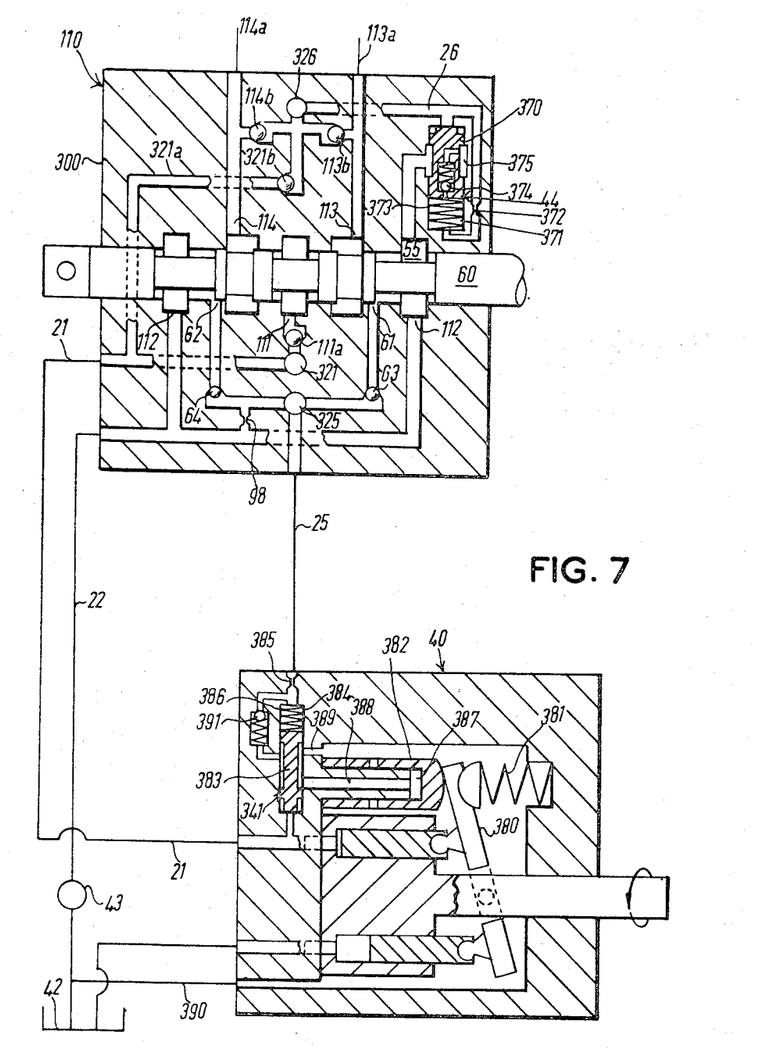
FIG. 7 is a diagrammatic section of one of the control valves in combination with another embodiment of pump adjusting device.

FIG. 7 is a transverse section through a valve block 300 containing the valves 110, 120, 130, 140, 150, 160 and 170. FIG. 7 illustrates diagrammatically the spool valve 110 in association with another embodiment of adjusting device 341 for the swashplate pump 40. The spool valve 110 is basically as illustrated in FIG. 3 and parts relevant to the description of FIG. 7 which have the same function as corresponding parts in FIG. 3 are denoted by like reference numerals. The valve block 300 contains longitudinal galleries 321, 325 and 326 to which the supply conduit 21, the service pressure conduit 25 and the service line relief conduit 26 are respectively connected. The non-return valve 111a leads from the gallery 321 to the supply port 111, the non-return valves 63 and 64 lead from the pressure sensing ports 61 and 62 to the gallery 325, and the non-return valves 113b and 114b lead from the service ports 113 and 114 to the common gallery 326.

The valve block 300 also contains the service line relief valve 44 which is capable of passing the full delivery of the pump 40. To minimise shock loads on the pump 40 a passage 321a connects the supply conduit 21 to a non-return valve 321b which leads to the gallery 326 connected by the conduit 26 to the relief valve 44. The relief valve 44 comprises a slide 370 the upper end of which is in direct communication with the relief conduit 26. The chamber 371 at the lower end of the slide 370 is connected through a restriction 372 to the relief conduit 26. The chamber 371 contains a light compression spring 373 biasing the slide 370 upwardly to the position illustrated. The valve slide 370 contains a pilot relief valve 374 connected between the valve chamber 371 and the valve outlet port 375 which is connected to the valve chamber 55 leading to the drain conduit 22. The pilot relief valve 374 is set to open at the relief pressure. Immediately the valve 374 opens upon relief pressure being attained in the relief conduit 26, the consequent flow through the restriction 372 causes a pressure drop in the chamber 371. The slide 370 then becomes unbalanced and is immediately moved downwards against the spring 373 by full relief pressure still being applied to the upper face of the slide 370. This connects the relief conduit 26 to the relief port 375 leading to the drain conduit 372.

FIG. 7 illustrates the swashplate 380 diagrammatically. The swashplate 380 is biased by a compression spring 381 towards its maximum inclination indicated and a swash control piston 382 acts against the spring 381. A control valve slide 383 is subjected at its lower end to the delivery pressure of the pump present in the supply conduit 21. A valve chamber 384 at the upper end of the slide 383 is connected through a restriction 385 to the service pressure conduit 25. The chamber 384 contains a compression spring 386 biasing the slide 383 downwardly to the position illustrated. In this position of the slide the interior 387 of the piston 382 is connected through a passage 388 to a passage 389 which leads to the interior of the pump housing. The interior of the pump housing is connected by a conduit 390 to the reservoir 42. A pilot relief valve 391 is connected between the chamber 384 to the passage 389 leading to the reservoir.

When one or more of the control valves such as the valve 110 is operated, the maximum service pressure is applied through the conduit 25 to the chamber 385. If the pressure in the supply conduit 21 should exceed this maximum service pressure by a predetermined amount, such as 250 p.s.i., determined by the compression spring 386, the valve slide 383 is moved upwardly by this pressure difference until the passage 388 is disconnected from the passage 389 and the pump outlet pressure is applied from the conduit 21 through the passage 388 to the piston interior 387. The piston is thereby moved to the right to decrease the swashplate angle and so reduce the rate of delivery of the pump until the delivery pressure is no longer more than 250 p.s.i. greater than the maximum service pressure present within the conduit 25.

The pilot relief valve 391 determines the maximum service pressure in the conduit 25. This pressure may for example be 2000 p.s.i. When this pressure is reached the valve 391 opens and the consequent flow through the restriction 385 causes a drop in pressure in the chamber 384 whereupon the pressure difference across the slide 383 is increased so moving the slide upwardly with a consequent decrease in the swashplate angle. In this way the maximum service pressure is restricted to 2000 p.s.i.

The pilot relief valve 374 is set to open at a pressure higher than that at which the relief valve 391 opens so that prevention of the pump delivering at an excess pressure is achieved by a reduction in swashplate angle through operation of the relief valve 391 rather than operation of the pilot relief valve 374 which would result in unloading of the pump through the relief valve 44 without a reduction in swash angle. The provision of the passage 321a and the non-return valve 321b connected to the relief valve 44 is a safety precaution in case the swash angle is not reduced sufficiently rapidly upon the occurrence of shock loads.

Figure 8:
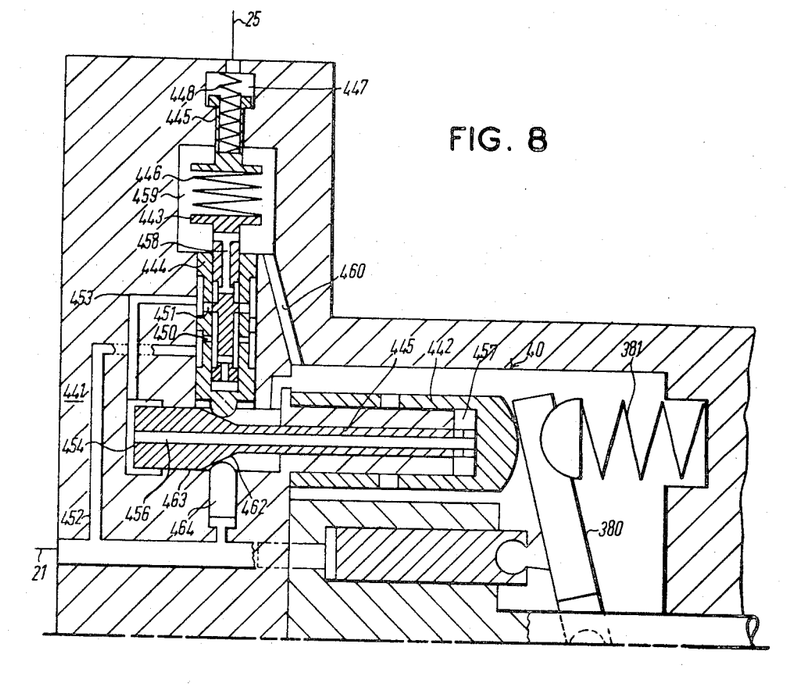
FIG. 8 is a diagrammatic section of a further embodiment of pump adjusting device.

FIG. 8 shows another embodiment of control device 441 for the swashplate pump 40. This device 441 comprises a swash control piston 442 acting on the swashplate 380 against a compression spring 381. The swash control piston 442 is controlled by a valve piston 443 slidable in a sleeve piston 444. The valve piston 443 is acted on by a captive piston 445 through a heavy spring 446. The piston chamber 447 of the piston 445 is connected to the service pressure conduit 25 and contains a light compression spring 448 biasing the piston 445 downwardly to its position illustrated.

The valve piston 443 co-operates with ports 450 and 451 in the sleeve piston 444. The port 450 is connected by a passage 452 to the pump supply conduit 21. The port 451 is connected to a conduit 453 leading to the rear face 454 of a follow-up piston 455 coaxial with the swash control piston 442. The follow-up piston 455 contains a through bore 456 connecting the passage 453 to the interior 457 of the swash control piston 442. The follow-up piston is constructed as a differential piston so that the fluid pressure acting on its rear face 454 is predominant and holds the front end of the follow-up piston 455 in abutment with the swash control piston 442.

In the lowermost position of the valve piston 443 relative to the sleeve piston 444, the lower end of the valve piston 443 is connected through the port 450 to the supply conduit 21 and the interior 457 of the swash control piston 442 is connected through the port 451, a passage 458 in the piston 443, a chamber 459 containing the stiff spring 446 and a passage 460 to the interior of the pump housing. The interior of the pump housing is connected directly to the reservoir 42 (not illustrated in FIG. 8). In this way the supply pressure acting on the piston 443 is opposed by the service pressure in the conduit 25 and the light spring 448 both acting on the piston 445. As the difference between the delivery pressure in the supply conduit 21 and the maximum service pressure in the conduit 25 increases above a value, such as 320 p.s.i., determined by the light spring 448, the valve piston 443 is moved upwardly to disconnect the port 451 from the passage 458 and connect this port 451 to the port 450 which receives the delivery pressure. In this way hydraulic fluid is supplied through the passage 452, the ports 450 and 451 and the passages 453 and 456 to the interior 457 of the control piston 442 to move this piston to the right and so decrease the swash angle until the delivery pressure has been reduced to not more than 320 p.s.i. greater than the maximum service pressure.

The control device 441 of FIG. 8 is provided with a maximum power override which is obtained by the heavy spring 446 and the sleeve piston 444. The bottom end of the sleeve piston 444 rests against a conical surface 462 on the follow-up piston 455 for swash angles between 14° maximum and 6¼°. For swash angles between 6¼° and 0° the sleeve piston 444 rests against a cylindrical surface 463 on the follow-up piston 455. The position of the sleeve piston 444 is thereby determined by the swash angle. The sleeve piston 444 is held against the surface of the follow-up piston 455 by the reaction of the delivery pressure acting on the valve piston 443. This reaction is balanced by a balancing piston 464 which lies opposite the sleeve piston 444 and whose rear face is also connected to the supply conduit 21.

It will now be assumed that the pressure difference between the supply pressure in the conduit 21 and the maximum service pressure in the conduit 25 is insufficient to move the captive piston 445 against the light spring 448. As the delivery pressure is increased (with corresponding increase in the maximum service pressure in the conduit 25) the heavy spring 446 is gradually compressed until the port 451 is disconnected from the passage 458 and is instead connected to the port 450. This results in a reduction in swash angle and consequent reduction in delivery pressure of the pump. As the swash angle is reduced the sleeve piston 444 is moved upwardly thus disconnecting again the port 450 from the port 451. In this way the delivery rate of the pump is gradually reduced with increasing delivery pressure between swash angles of 14° and 6¼°. If the conical surface 462 has an appropriate cone angle the maximum power output of the pump can be maintained approximately constant for all swash plate angles between 14° and 6¼°, the corresponding maximum pressure increasing from 1100 p.s.i. to 2500 p.s.i. as the swash angle is decreased from 14° to 6¼°. Between 6¼° and 0° swash angle, the maximum output pressure of the pump remains at 2500 p.s.i., for the sleeve piston 444 remains in contact with the cylindrical surface 463 between these swash angles.

What I claim is:

1. A hydraulic supply and control system for supplying and controlling hydraulic equipment having variable requirements as regards operating pressure and volumetric consumption of hydraulic fluid comprising a variable volume pump connected by its delivery line to a supply port of at least one control valve, said control valve having at least one service port for connection to the hydraulic equipment, and a control device for adjusting the pump, said control device being connected to a service pressure conduit connected so as to be subjected substantially to the instantaneous operating pressure of the hydraulic equipment when operating, whereby to adjust the delivery volume of the pump to correspond to the requirements of the equipment connected to said service port, said control device for said pump comprising a plunger mechanism adapted to adjust the pump delivery volume, a valve slide for controlling the pressure applied to said plunger mechanism, a piston acting on said valve slide through a stiff spring, the rear end of said piston being connected to said service pressure conduit and the rear end of said valve slide being connected to the pump line, and a comparatively light spring assisting said piston in opposing said valve slide through said stiff spring, said valve slide being adapted to adjust the pressure applied to the end plunger mechanism to decrease the pump delivery volume as the pump delivery pressure increases relative to the maximum service pressure in the service pressure conduit as assisted by said comparatively light spring.

2. A supply and control system as claimed in claim 1 wherein said plunger mechanism comprises opposed plungers acting on an operating lever adjusting the pump delivery volume, the rear end of one of said plungers being connected to the pump delivery to tend to decrease the pump delivery volume and the rear end of the other of said plungers being connected to said valve slide and being subjected to the biasing force of a spring tending to increase the pump delivery.

3. A hydraulic supply and control system for supplying and controlling hydraulic equipment having variable requirements as regards operating pressure and volumetric consumption of hydraulic fluid comprising a variable volume pump connected by its delivery line to a supply port of at least one control valve, said control valve having at least one service port for connection to the hydraulic equipment, and a control device for adjusting the pump, said control device being connected to a service pressure conduit connected so as to be subjected substantially to the instantaneous operating pressure of the hydraulic equipment when operating, whereby to adjust the delivery volume of the pump to correspond to the requirements of the equipment connected to said service port, said control device for said pump comprising a control piston adapted to decrease the pump delivery volume as pressure is applied to said control piston and a valve slide connected at one end to the pump delivery line and having at its other end a valve chamber connected to the service pressure conduit, said valve slide being biased by a spring in a direction to assist the maximum service pressure in the service pressure conduit, said valve slide being adapted to apply pressure to said control piston when the difference between the pump delivery pressure and the maximum service pressure exceeds a value predetermined by said spring.

4. A supply and control system as claimed in claim 3 wherein said valve chamber is connected through a restriction to said service pressure conduit and is also connected to a pressure relief valve for determining the maximum delivery pressure of the pump.

5. A hydraulic supply and control system for supplying and controlling hydraulic equipment having variable requirements as regards operating pressure and volumetric consumption of hydraulic fluid comprising a variable volume pump connected by its delivery line to a supply port of at least one control valve, said control valve having at least one service port for connection to the hydraulic equipment, and a control device for adjusting the pump, said control device being connected to a service pressure conduit connected so as to be subjected substantially to the instantaneous operating pressure of the hydraulic equipment when operating, whereby to adjust the delivery volume of the pump to correspond to the requirements of the equipment connected to said service port, said control device for said pump comprising a control piston adapted to decrease the pump delivery volume as pressure is applied to said piston, a valve piston movable in a sleeve piston, a further piston opposing said valve piston through a stiff spring, a comparatively light spring assisting said further piston in opposing said valve piston through said stiff spring, the rear face of said valve piston being connected to the pump delivery line and the rear face of said further piston being connected to said service pressure conduit, said sleeve piston resting against an inclined surface movable as said control piston moves in such a manner that the sleeve piston is moved towards said further piston as the pump delivery volume is decreased, said valve and sleeve pistons being adapted to supply pressure to said control piston to decrease the pump delivery volume both when the difference between the delivery pressure of the pump and the maximum service pressure in the service pressure conduit exceeds a value determined by said light spring and when said delivery pressure exceeds a value determined by the position of said inclined surface and by said stiff spring.

6. A supply and control system as claimed in claim 5 wherein said pump is a swashplate pump with an adjustable swashplate angle.

7. A hydraulic supply and control system for supplying and controlling a plurality of hydraulic devices having variable pressure and volumetric requirements which comprises a variable volume pump, a control valve for each hydraulic device to which the outlet of the pump is connected, said control valve being operative to provide unrestricted communication of fluid to the hydraulic devices, and a control mechanism connected hydraulically to a service pressure conduit extending between the control valve and the hydraulic devices and responsive to the highest operating pressure of fluid being supplied to any of said devices to vary the pressure and volume of the pump in accordance with the requirements of the hydraulic equipment by increasing the volume as the pressure increases and decreasing the volume as the pressure decreases, a backhoe having a bucket, a boom on which said bucket is movably mounted, and at least one hydraulic motor for raising and lowering said boom, said hydraulic motor comprising one of said hydraulic devices to which the outlet of the pump is connected, and an actuator for slewing said boom.

8. A supply and control system as claimed in claim 7 wherein said actuator for slewing the boom comprises a rotary actuator.

9. A supply and control system as claimed in claim 7 wherein said actuator for slewing the boom comprises a linear actuator provided with a rack and pinion drive.

10. A supply and control system as claimed in claim 7 including cam-controlled positional valves in the service conduits between said actuator and said control valve for said actuator, said cams of said valves being readily adjustable wherein the slewing motion in either direction may be terminated automatically at a predetermined position.

11. A supply and control system as claimed in claim 7 including a dipper pivoted to said boom on which said bucket is pivotally supported, a second hydraulic motor for pivoting the dipper relative to the boom and a third hydraulic motor for crowding the bucket relative to the dipper, said second and third hydraulic motors each comprises one of said plurality of hydraulic devices.

References Cited
UNITED STATES PATENTS

| | | | |
|---|---|---|---|
| 2,892,312 | 6/1959 | Allen et al. | 60—52 |
| 2,026,776 | 1/1936 | Douglas et al. | |
| 2,472,477 | 6/1949 | Harrington. | |
| 2,867,091 | 1/1959 | Orfloff et al. | |
| 2,903,145 | 9/1959 | Brinkel | 214—138 |

HUGO O. SCHULZ, Primary Examiner.